Nov. 11, 1941.                R. REYNOLDS                2,262,300

FISHING ROD TIP

Filed April 19, 1941

INVENTOR
REGINALD REYNOLDS
BY HARRIS, KIECH, FOSTER & HARRIS
FOR THE FIRM
ATTORNEYS.

Patented Nov. 11, 1941

2,262,300

UNITED STATES PATENT OFFICE 2,262,300

FISHING ROD TIP

Reginald Reynolds, Carpinteria, Calif.

Application April 19, 1941, Serial No. 389,336

9 Claims. (Cl. 43—24)

This invention relates to fishing rod tips, and as to some of the features of the invention it relates more particularly to fishing rod tips of the sheave type in which the line guiding means includes a pulley or sheave.

One object of the invention is to provide a tip of such configuration and design that the line will not loop about the tip, especially when preparing for the operation of casting or during the casting operation.

It is another object of the invention to provide a fishing rod tip of the sheave type in which the sheave will run with a minimum of friction between its side faces and the frame parts of the tip.

It is another object to provide a fishing rod tip of the sheave type in which the sheave will rotate with a minimum of rolling friction.

It is another object of the invention to provide a fishing rod tip of the sheave type in which the bearings shall be sandproof and waterproof, and which may be readily disassembled for cleaning purposes.

It is another object of the invention to provide a fishing rod tip which will be adaptable for use with fishing rods of various types and of various diameters at their outer ends.

It is still another object of the invention to provide in a fishing rod tip of the sheave type means for guiding the fishing line through the tip of such a character that the line may travel through the tip at high speed with little danger of becoming caught or tangled and with minimum of wear upon the line.

It is another object of the invention to provide a fishing rod tip of the sheave type which will be inexpensive of manufacture, sturdy of construction, and of great durability, requiring a minimum of care and attention.

Other objects and advantages of the invention will be apparent from a reading of the following description of one embodiment of this invention, taken in connection with the drawing, and from the reading of the appended claims.

In the drawing, which shows one embodiment of the invention and is for illustrative purposes only:

Figure 1:
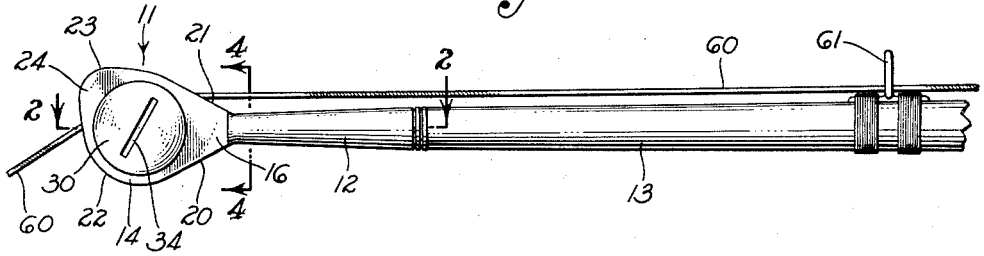
Fig. 1 is a side elevation of a fishing rod tip of this invention shown attached to the outer end portion of a fishing rod.
Figure 2:
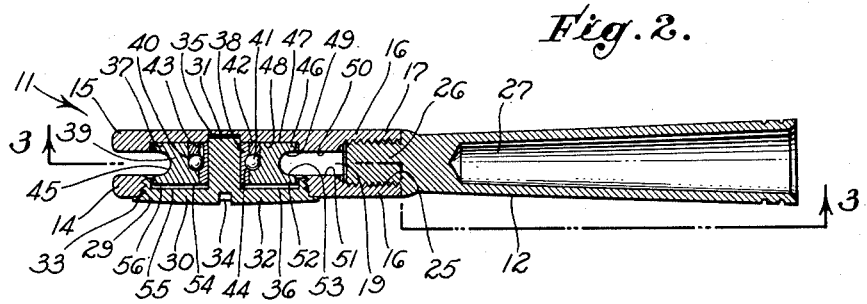
Fig. 2 is an enlarged longitudinal sectional view of the fishing rod tip taken along the line 2—2 of of Fig. 1.
Figure 3:
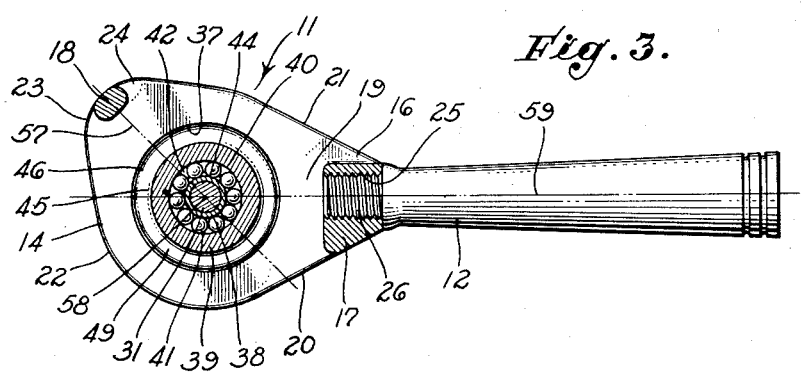
Fig. 3 is a longitudinal sectional view of the tip taken along the line 3—3 of Fig. 2.
Figure 4:
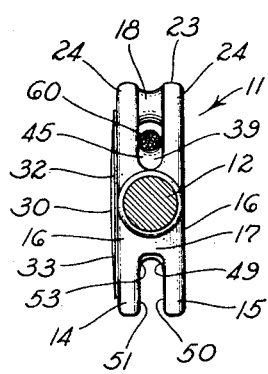
Fig. 4 is an enlarged sectional view of the tip taken along the line 4—4 of Fig. 1.

The tip comprises a head 11 and a ferrule 12, the ferrule being adapted for securement to the outer end portion 13 of a fishing rod.

The frame structure of the tip comprises a pair of side plates 14 and 15 of similar plan configuration, integrally joined at their bases 16 by a yoke 17 and at their outer ends by a bridge 18. The side plates 14 and 15 are disposed in parallel and laterally aligned relationship, enclosing a spacing chamber 19.

Each of the side plate 14 and 15 has a peripheral configuration in the general shape of a pear, characterized by two straight lines 20 and 21 converging toward and extending to the base 16 and by a curvilinear line 22 in the general shape of the arc of a circle having a protuberance 23 and smoothly connecting the outer ends of the straight lines 20 and 21. The bridge 18 connects ears 24 of the two side plates 14 and 15, respectively, these ears being defined outwardly by the protuberances 23 of the curves 22.

The yoke 17 has an internally threaded longitudinal bore 25 into which is threadedly secured a threaded outer end 26 of the ferrule 12. The ferrule 12 is formed with a socket 27 in which is disposed the conforming tip of the outer end portion 13 of the fishing rod. The rod is securely joined to the ferrule by wrappings of thread 28 or by any other suitable means.

The side plate 14 is formed with a transverse bore-threaded circular opening 29 of a diameter as large as may be without unduly weakening the portions of the side plate 14 between the opening 29 and the plate periphery.

In this opening 29 is secured a mount for a fishing line sheave. This mount comprises a circular disk or plate 30 threaded on its rim and adapted to be screwed into the opening 29 and formed with a spindle 31 extending inwardly of the space 19 from the center of the disk. The outer face 32 of the disk 30 is substantially flush with the outer face of the side plate 14 when the plate 30 is screwed into position and is smoothly contoured so that it may not catch or snarl the fishing line. A peripheral flange 33 limits inward movement of the disk 30 and a slot 34 is formed on the outer face of this disk for engagement by a screwdriver, a coin or other convenient object for turning the plate 30.

The free end of the spindle 31 is seated and snugly fits within a cylindrical inwardly opening recess 35 formed in the side plate 15.

The inner side of the disk 30 is countersunk to provide a cylindrical recess 36. The side plate 15 is formed on its inner face with a shallow cylindrical recess 37 which is concentric with the smaller cylindrical recess 35 in the plate 15 and of the same diameter and axially aligned with the recess 36 in the disk 30.

An inner roller bearing race 38 is revolvably mounted on the spindle 31. A fishing line sheave 39 formed on its bore surface with an outer race groove 40 is revolvably mounted upon the inner race 38. The inner race 38 is formed on its rim with a race groove 44 and a small longitudinally arranged groove 43 extends from one end of the race to the groove 44. Balls 41 are disposed between the grooves 40 and 44 and are held in place by a retaining ring 42. The balls are initially inserted in the raceway between the inner race 38 and the sheave 39 by removing the ring 42 and dropping the balls one by one in place between the groove 43 and the outer wall of the groove 40.

The sheave 39 is peripherally grooved at 45. The thickness of the flange 46 between the side face 49 of the groove 45 and the side face 47 of the sheave 39 is substantially the same as the depth of the recess 37 so that when the face 47 of the pulley 39 is in contact with the bottom wall 48 of the recess 37 the side face 49 of the groove 45 is substantially flush with the inner face 50 of the plate 15. The depth of the recess 36 in the disk 30 with respect to the inner side face 51 of the plate 14 when the disk 30 is in its secured position is preferably somewhat greater than the depth of the recess 37. The width of the groove 45 and the thickness of the flange 52 are such that when the sheave 39 is in contact with the bottom wall 48 of the recess 37, the side face 53 of the groove 45 is substantially flush with the inner face 51 of the side plate 14 and the side face 54 of the sheave 39 is laterally spaced from the bottom wall 55 of the recess 36 providing a disk shaped chamber 56.

When the sheave mount and sheave are assembled upon the tip, this chamber 56 is packed with grease to hold the sheave in contact with the bottom wall 48 of the recess 37 and to prevent access of water, sand, or other fine bodies around the rim of the flanges 46 and 52 to the bearing surfaces between the spindle 31 and the inner race 38 or the bearing surfaces which house the balls 41.

The ears 24 and the bridge 18 are so disposed with reference to the fishing rod frame structure that a line 57 drawn from the bridge to the axis 58 of the sheave makes an angle of approximately 45° with the axis 59 of the ferrule 12 and head 11 which is also the axis of the fishing rod when it is attached to the ferrule and by means of the ferrule to the head 11. It will be observed that the spacing chamber 19 between the sides 14 and 15 is unobstructed at all points between the side plates 14 and 15 except by the bridge 18, the sheave 39 and its spindle 31, and the yoke 17.

In using a tip of this invention, after the ferrule 12 and head 11 have been screwed together and the ferrule secured to the outer end of a fishing rod, a fishing line 60 is threaded outwardly from the reel (not shown) through a series of eyes, the outermost of which, 61, is shown in Fig. 1. From the eye 61 the line is passed through the side plates of the head between the sheave 39 and the bridge 18. When the rod and tip are in use, the line 60 engages the groove 45 of the sheave 39 over a small arc and extends downward at an angle to the water.

A fishing rod tip constructed in accordance with this invention possesses a number of advantages. The line runs freely through the tip by reason of the rolling contact of the balls 41 with the sheave 39 and the inner race 38 and the rotative sliding contact of the race 38 with the spindle 31. These bearing contact surfaces are protected from water and foreign particles and their lubrication is maintained by a pack of lubricating grease in the grease chamber 56.

The bottom wall 48 of the recess 37 and the side face 47 of the sheave 39 are maintained in true parallel end thrust alignment for several reasons. The plates 14 and 15 are held in rigid relationship by the integrally connected bridge 18 and yoke 17. The spindle 31 is held exactly perpendicular to the plates 14 and 15 both because of the large diameter of the threaded connection of the disk 30 with the plate 14 and by the seating of the free end of the spindle 31 in the recess 35 of the plate 15.

The sheave mount is readily disassembled for cleaning and lubrication by the single easy operation of unscrewing the disk 30 from the side plate 14.

The seating of the flanges 46 and 52 of the sheave 39 in the recesses 37 and 36 prevents the entrance of water and foreign matter to the sheave bearings and permits a narrow spacing of the side plates 14 and 15 to prevent whipping of the fishing line between the side plates thereby reducing wear of the fishing line against the peripheral edges of the side plates as the line leaves the head 11. The seating of the sheave flanges within these recesses also obviates riding of the line on the flange rims or lodgment of sand or other foreign particles on these rims from which they could work their way inwardly along the sides of the sheave to the sheave bearing.

No small screws are used in assembling the parts of the tips, the only fastening connections, threaded or otherwise, being that between the ferrule and the yoke 17 and that between the disk 30 and the side plate 14. Both of these threaded connections are of such a character that they will not be readily loosened. Small screws used in assembling the parts of a fishing rod tip or other fishing tackle are, as is well known, apt to become loose and require frequent tightening or to become lost if the loosening is not observed in time.

Because the diameter of the sheave is small relative to the span across the side plates, the inner faces of the side plates radially around the sheave are sufficiently extended to hold the fishing line in proper seated relationship within the groove 45, preventing its riding up the sides of the groove with consequent undue wear upon the line and with a tendency to be whipped completely out of the spacing chamber between the plates 14 and 15 and chafing against the outside surfaces of the plates.

The assembly and securement together of the several parts of the head 11 are accomplished independently of the connection of the head with the ferrule 12. It thus becomes possible to supply with the same head interchangeable ferrules for use with fishing rods of different diameters.

The head is so shaped as to the plan configuration of its side plates that the fishing line will not wind and be caught around the tip in preparing for casting, in the operation of casting, or as a result of backlashing. The straight character of the lines 20 and 21, their relatively small angle to the axis of the rod, ferrule and head, the short blunt-nosed shape of the head and the proximity radially of the ears 24 to the sheave axis 58 are features each of which contribute to prevent winding of the line about the head 11.

Except for the bridge 18, which is essential to the proper guiding of the fishing line through the head, there are no other cross elements between the plates obstructing the spacing chamber 19 to wear against the fishing line as it passes through the head.

I claim as my invention:

1. In a fishing rod tip, the combination of: a frame structure comprising a first side plate and a second side plate, and means integrally connecting said plates in substantially parallel spaced relationship, said first plate being formed with a transverse threaded circular opening, and said second plate being formed solid opposite said opening; means for connecting said frame structure to a fishing rod; a fishing line sheave mount comprising a rim threaded disk adapted to be threadedly secured in said opening and when so secured to have its outer face smoothly contoured with the outer face of said first plate, and further comprising a spindle mounted on and extending inwardly from said disk across the space between said plates; and a fishing line sheave mounted on said spindle between said plates.

2. In a fishing rod tip, the combination of: a frame structure comprising a first side plate and a second side plate, and means rigidly connecting said plates in substantially parallel spaced relationship, said first plate being formed with a transverse threaded circular opening and said second plate being formed with an inwardly opening recess coaxial with said opening; means for connecting said frame structure to a fishing rod; a fishing line sheave mount comprising a rim threaded disk adapted to be threadedly secured in said opening and when so secured to have its outer face smoothly contoured with the outer face of said first plate, and further comprising a spindle mounted on and extending inwardly from said disk across the space between said plates and having its free end laterally immovably seated in said recess; and a fishing line sheave mounted on said spindle between said plate.

3. In a fishing rod tip, the combination of: a frame structure comprising a first side plate and a second side plate and means integrally connecting said plates in substantially parallel spaced relationship, said first plate being formed with a transverse threaded opening of a diameter approximating the minimum span of said plate; means for connecting said frame structure to a fishing rod; a fishing line sheave mount comprising a rim threaded disk adapted to be threadedly secured in said opening, and said mount further comprising a spindle mounted on and extending inwardly from said disk across the space between said plates; and a fishing line sheave mounted on said spindle between said plates, said sheave being of a diameter less than that of said opening.

4. In a fishing rod tip, the combination of: a frame structure comprising a first side plate and a second side plate and means rigidly connecting said plates in substantially parallel spaced relationship, said first plate being formed with a transverse threaded opening; means for connecting said frame structure to a fishing rod; a fishing line sheave mount comprising a rim threaded disk adapted to be threadedly secured in said opening, and further comprising a spindle mounted on and extending inwardly from said disk across the space between said plates; a fishing line sheave mounted on said spindle between said plates; and a rolling contact bearing interposed between said spindle and said sheave.

5. In a fishing rod tip, the combination of: a frame structure comprising a first side plate and a second side plate and means rigidly connecting said plates in substantially parallel spaced relationship, said first plate being formed with a transverse threaded circular opening; means for connecting said frame structure to a fishing rod; a fishing line sheave mount comprising a rim threaded disk adapted to be threadedly secured in said opening, and said mount further comprising a spindle mounted on and extending inwardly from said disk; an inner race rotatably mounted on said spindle; a fishing line sheave rotatably mounted on said inner race and provided with an outer race; and rolling elements interposed between said races.

6. In a fishing rod tip, the combination of: a frame structure comprising a first side plate and a second side plate and means rigidly connecting said plates in substantially parallel spaced relationship, said first plate being formed with a transverse opening; means for connecting said frame structure to a fishing rod; a fishing line sheave mount comprising a plate of substantially the same thickness as said first plate adapted to be securely seated in said opening, and formed on its inner face with a first inwardly opening cylindrical recess, said second plate being formed with a second inwardly opening cylindrical recess of substantially the same diameter and coaxial with said first recess, and said mount further comprising a spindle mounted on and extending inwardly from the center of said disk across the space between said plates; and a fishing line sheave rotatably mounted on said spindle, said sheave being of an overall diameter to snugly slidably fit both longitudinally and rotatably within said recesses, the overall peripheral thickness of said sheave being at least equal to the width of the space between said first and second plates plus the depth of said second recess and less than the width of said space plus the depths of both said recesses.

7. In a fishing rod tip, the combination of: a frame structure comprising a first side plate and a second side plate and means for rigidly connecting said plates in substantially parallel spaced relationship, said first plate being formed with a transverse opening; means for connecting said frame structure to a fishing rod; a fishing line sheave mount comprising a plate of substantially the same thickness as said first plate and adapted to be securely seated in said opening and formed on its inner face with an inwardly opening cylindrical recess, and said mount further comprising a spindle mounted on and extending inwardly from the center of said disk across the space between said plates; a fishing line sheave rotatably mounted on said spindle, said sheave being of an overall diameter to snugly slidably fit both longitudinally and rotatably within said recess, and the overall peripheral thickness of said sheave being appreciably greater than the space between said first and second plates.

8. In a fishing rod tip, the combination of: a frame structure comprising two side plates of similar configuration and means for rigidly connecting said plates in laterally aligned and substantially parallel spaced relationship; means at the base of said plates for attaching them to a fishing rod, each of said plates having in plan contour the shape of a pear with substantially straight sides converging toward said base at angles of approximately 30° to the axis of said rod when attached to said tip by said attaching means, and with a smooth end curve smoothly connecting the outer ends of said straight sides, said curve being substantially the arc of a circle characterized by a lateral protuberance directed outwardly and laterally from said base on the fishing line side of said tip; and a line guiding means mounted between said plates comprising a fishing line sheave rotatably mounted between said plates with its axis substantially intersecting the axis of said rod when attached to said tip by said attaching means, and a bridge rigidly connecting said plates at said protuberances, a line drawn from said bridge to the axis of said sheave forming an angle of approximately 45° with the axis of said rod.

9. In a fishing rod tip, the combination of: a frame structure comprising two side plates of similar configuration and means for rigidly connecting said plates in lateral alignment and substantially parallel spaced relationship; means for connecting said frame structure to a fishing rod; a fishing line sheave mount carried by said frame structure between said plates; and a fishing line sheave rotatably carried by said mount, said frame structure and sheave mount providing two oppositely disposed, inwardly opening, cylindrical recesses to snugly receive the peripheral edges of said sheave, the width of the groove of said sheave being substantially equal to the spacing of said plates, the side walls of said groove and inner surfaces of said plates beyond said groove providing a guide channel for the fishing line extending radially outwardly from the root of said groove at all points of contact of said fishing line with the root of said groove a distance a plurality of times greater than the spacing between said plates.

REGINALD REYNOLDS.